United States Patent [19]
Kuwabara

[11] 3,724,268
[45] Apr. 3, 1973

[54] METERING APPARATUS FOR NUCLEAR REACTORS

[75] Inventor: Jun Kuwabara, Ibaraki-ken, Japan
[73] Assignee: Atomic Power Development Associates, Inc., Detroit, Mich.
[22] Filed: Aug. 28, 1970
[21] Appl. No.: 67,783

Related U.S. Application Data

[63] Continuation-in-part of Ser. No. 875,202, Nov. 10, 1969, abandoned.

[52] U.S. Cl..............................73/194 EM, 73/198
[51] Int. Cl................................................G01p 5/08
[58] Field of Search....73/194 EM, 344, 198; 176/19, 176/26; 324/34 FL; 310/11

[56] References Cited

UNITED STATES PATENTS

| 3,347,224 | 10/1967 | Adams | 73/194 EM UX |
| 2,149,847 | 3/1939 | Kolin | 73/194 EM |
| 2,782,369 | 2/1957 | Werner et al. | 73/194 EM X |

FOREIGN PATENTS OR APPLICATIONS

| 888,222 | 1/1962 | Great Britain | 73/194 EM |
| 1,216,560 | 3/1963 | Germany | 73/194 EM |

OTHER PUBLICATIONS

Kolin, "Electromagnetic Velometry, I.A. Method for the Determination of Fluid Velocity Distribution in Space and Time", Journal Applied Physics, Vol. 15, Feb. 1944, pp. 150–164.

*Primary Examiner*—Charles A. Ruehl
*Attorney*—Ward, McElhannon, Brooks & Fitzpatrick

[57] ABSTRACT

This invention relates to apparatus for determining the temperature and/or flow of a conductive fluid through a nuclear reactor subassembly including a pair of permanent magnets, with or without pole pieces, which is installed toward the end of the subassembly to provide a magnetic field in the open channel in the subassembly, and a pair of electrodes which is inserted into the open channel and supported from internal structure of the nuclear vessel, which is independent of the subassembly.

10 Claims, 8 Drawing Figures

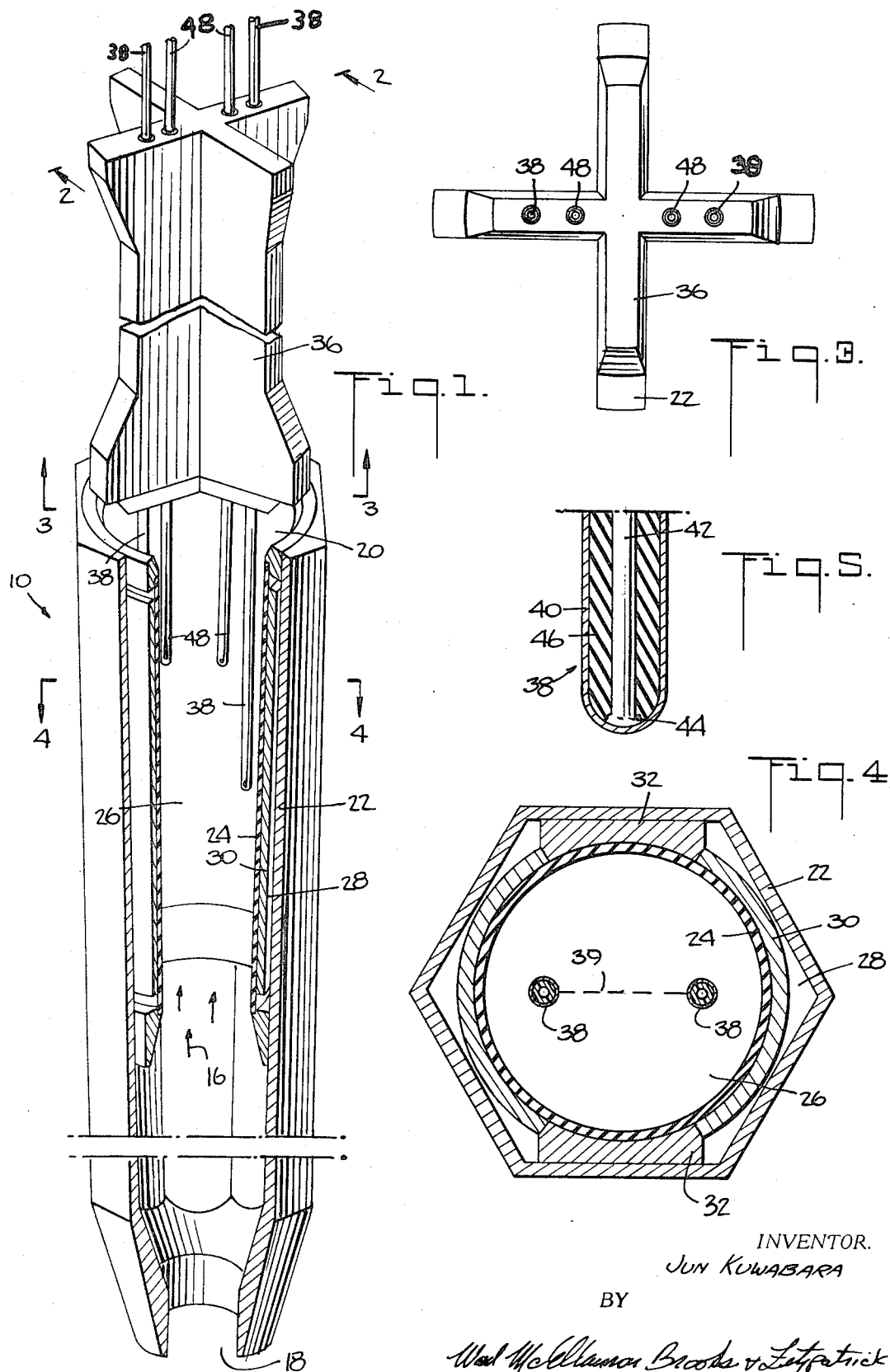

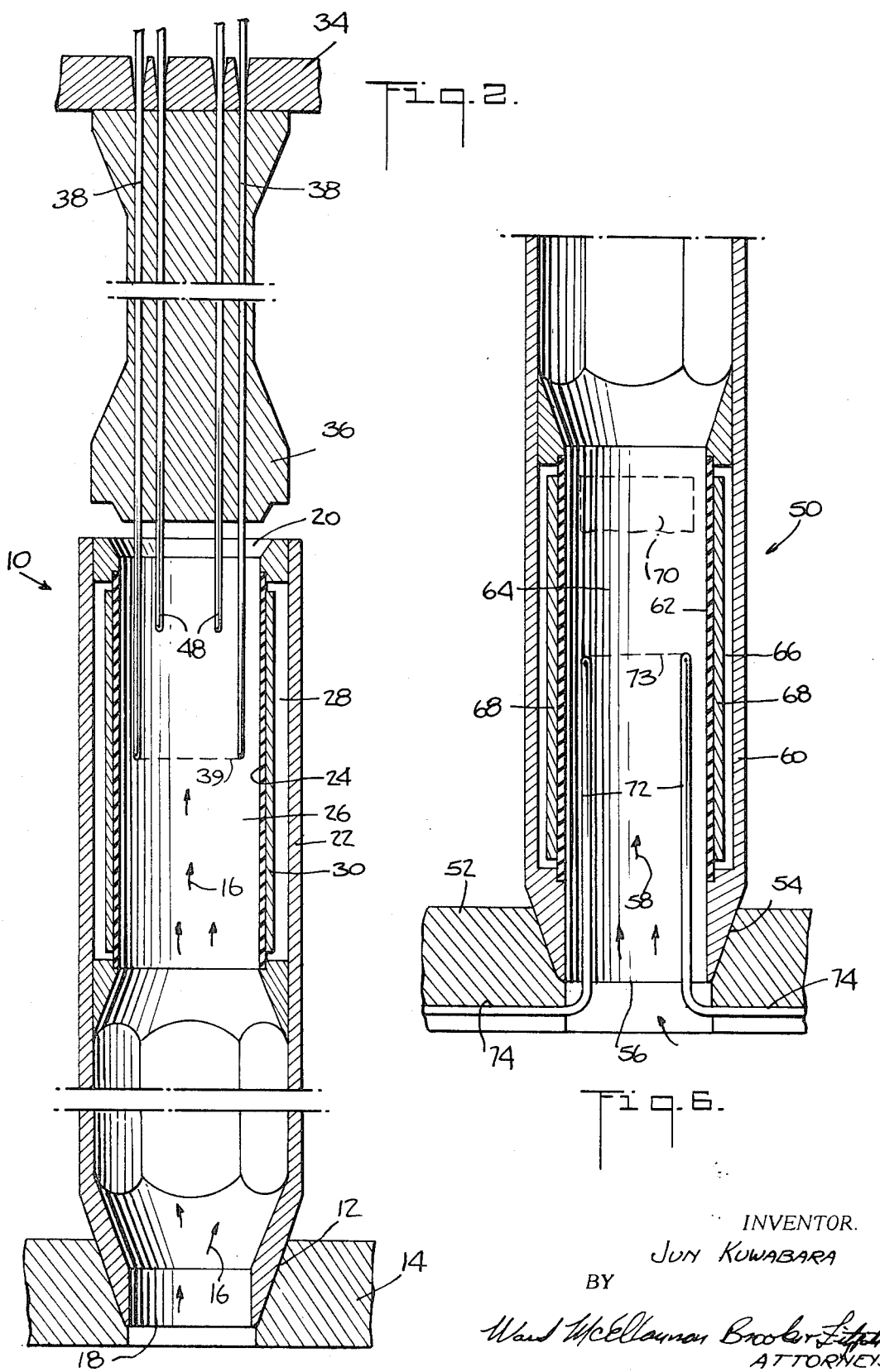

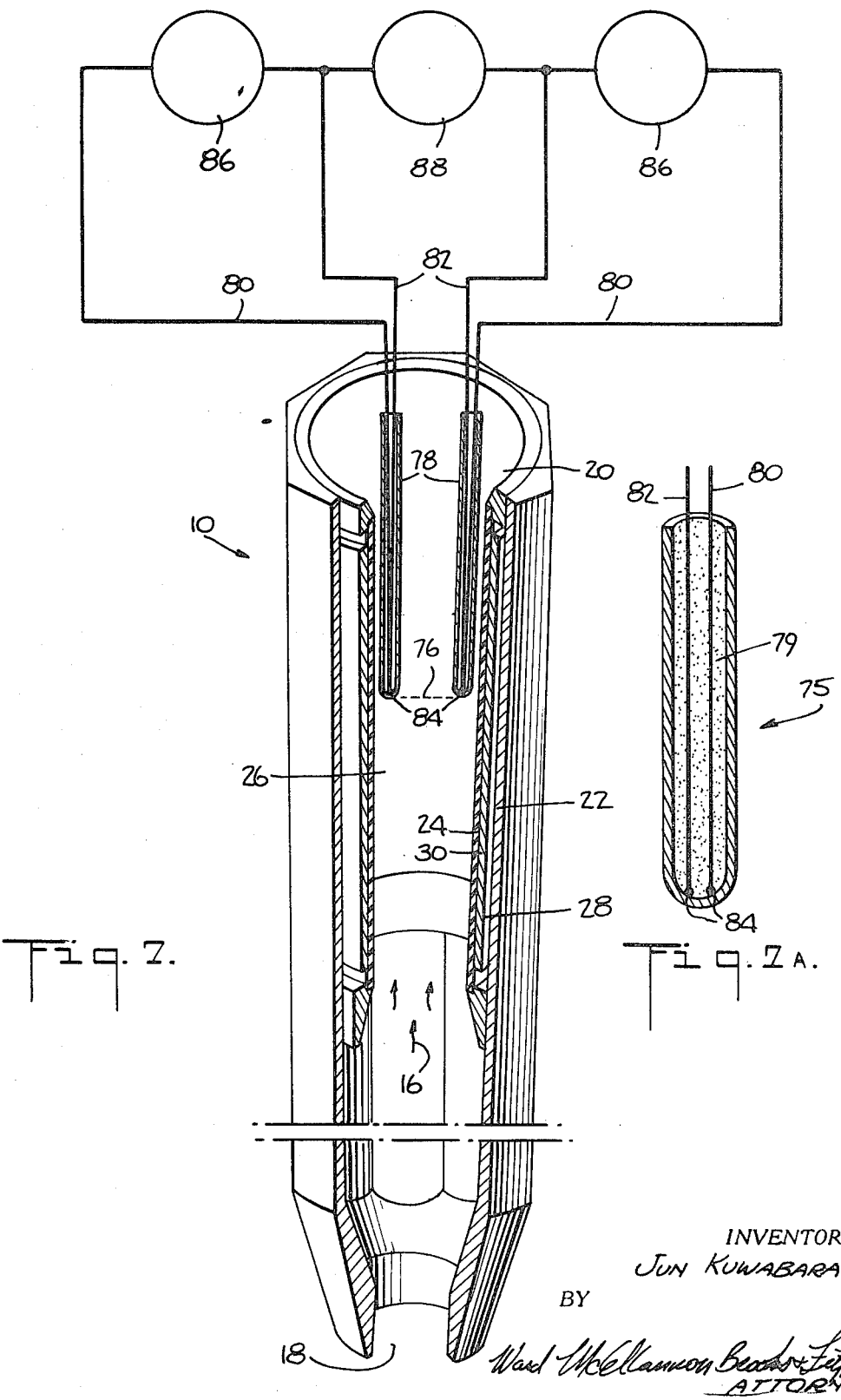

METERING APPARATUS FOR NUCLEAR REACTORS

This application is a continuation-in-part application of my copending application Ser. No. 875,202, entitled "Flowmeter for a Nuclear Reactor", filed Nov. 10, 1969, now abandoned.

This invention has to do with apparatus for continuously determining the temperature and/or flow of conductive fluid through a nuclear reactor subassembly, which is particularly adapted, among other possible uses, for determining the temperature and/or flow of liquid metal such as sodium through a liquid metal fast breeder reactor.

Heretofore, it has been proposed to employ a permanent magnet flowmeter in a liquid metal system having a pair of electrodes attached to the outside wall of a non-magnetic metal pipe in which the liquid metal flows across the magnetic field. However, such flowmeters have the disadvantage that they require wiring from the subassembly to the reactor vessel penetration as well as wiring inside the subassembly, per se. It will be appreciated that in most recent liquid metal cooled reactors, individual subassemblies are handled by a common handling mechanism through a common access port, and hence such wiring creates major problems.

The present invention involves a novel combination of features combined in such a way as to afford a very efficient solution to the difficulties encountered with the prior art, as will become apparent as the description proceeds.

In order to accomplish the desired result, this invention in one form thereof provides new and improved apparatus for continuously determining the flow of conductive fluid through a nuclear reactor subassembly characterized by a subassembly having a channel therein for the flow of the fluid therethrough. A pair of permanent magnets is mounted adjacent the channel to produce a magnetic field traversing the channel, and a pair of electrodes is supported independently of the subassembly, and they project into the channel so that an imaginary line interconnecting the ends thereof is perpendicular to the axis of flow of the fluid through the channel and also perpendicular to the magnetic field. The electrodes serve as an e.m.f. pickup responsive to the fluid flow through the subassembly, and means are provided for carrying said e.m.f. to an instrument circuit.

According to one aspect of the invention, the subassembly is mounted on a support plate, and the electrodes are supported by the support plate and extend upwardly into the channel. According to another aspect of the invention, the channel in the subassembly is formed by an inner cylindrical wall and an outer shell surrounds this wall, the permanent magnets being mounted between the outer shell and the inner cylindrical wall. In one form of the invention, a pair of pole pieces is mounted adjacent the permanent magnets to enlarge the magnetic field area.

According to still another aspect of the invention, the electrodes comprise an outer stainless steel sheath and a medial stainless steel conductor, with insulation interposed therebetween, the sheath being connected to the conductor at the end thereof. The sheath serves as an e.m.f. pickup and the conductor serves to carry the e.m.f. to an instrument circuit.

According to an aspect of the invention, each of the electrodes comprises a grounded type sheathed thermocouple having two members of dissimilar materials. Read-out means are connected to at least one of the thermocouples for indicating the temperature of the fluid flowing through the nuclear reactor assembly. One member of one electrode is fabricated from the same material as one member of the other electrode, and fluid flow read-out means are connected between the two members of the same material for indicating the flow of conductive fluid through the nuclear reactor assembly.

In conformity with another aspect of the invention, an instrument plate is mounted above the subassembly in spaced relationship with respect thereto, and a block is interposed between the plate and the top of the subassembly to prevent upward movement of the subassembly. The pair of electrodes is carried by and pass downwardly through the instrument plate and the block and project downwardly into the open channel in the subassembly.

There has thus been outlined rather broadly the more important features of the invention in order that the detailed description thereof that follows may be better understood and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a perspective view of a subassembly and associated nuclear reactor vessel internal structure incorporating a flowmeter constructed according to the concept of this invention;

FIG. 2 is a vertical sectional view taken along the line indicated at 2—2 in FIG. 1;

FIG. 3 is an enlarged transverse sectional view taken along the line indicated at 3—3 in FIG. 1;

FIG. 4 is an enlarged transverse sectional view taken along the line indicated at 4—4 in FIG. 1;

FIG. 5 is an enlarged fragmentary view showing details of the electrodes;

FIG. 6 is an enlarged vertical sectional view of a subassembly and associated nuclear reactor vessel internal structure incorporating another embodiment of a flowmeter constructed according to the concept of this invention;

FIG. 7 is a perspective view of a subassembly and associated nuclear reactor vessel internal structure incorporating apparatus for continuously determining the temperature and flow of the conductive fluid through the nuclear reactor according to this invention; and FIG. 7a is an enlarged perspective view of one of the electrodes used in the subassembly of FIG. 7.

Referring to the drawings in greater detail, as shown in FIGS. 1 and 2, a hexagonal nuclear reactor subassembly, indicated generally at 10, is mounted in an opening 12, FIG. 2, in a support plate 14 and liquid sodium flows upwardly therethrough, as indicated by arrows 16. That is, the subassembly is provided with a lower inlet 18 and an upper outlet 20 for the passage of liquid sodium. The subassembly comprises an outer hexagonal shell 22 extending the length thereof, and a cylindrical wall 24 forming a round-sectioned open channel 26 towards the outlet 20. As best seen in FIG. 4, in the annular space 28 between the cylindrical wall and the hexagonal shell, a pair of permanent magnets 30 is installed so that a magnetic field traverses the open channel 26. Pole pieces 32 are positioned adjacent the permanent magnet 30 to enlarge the area of the magnetic field. An instrument plate 34 is hung from an upper structure (not shown) of the reactor vessel and is independent of the subassembly. A block 36 is hung from the instrument plate and serves to prevent the subassembly from moving upwardly due to the action of the flowing fluid.

Still referring to FIGS. 1–4, a pair of electrodes 38 is carried by and passed through narrow openings in the instrument plate 34 and the block 36 and project down into the open channel 26. The electrodes are so disposed that an imaginary line 39 connecting the ends thereof is perpendicular to the axis of flow of the fluid sodium and also perpendicular to the force of the magnetic field produced by the permanent magnets 30. As best seen in FIG. 5, each of the electrodes 38 includes a stainless steel outer sheath 40. In the center of the sheath, there is a conductor 42 which is also fabricated from stainless steel. At the end of the electrode, the sheath 40 and the conductor 42 are welded together, as at 44, FIG. 5. The area between the sheath and the conductor is filled with an insulator 46 fabricated from magnesium oxide or aluminum oxide. The sheath, in the portion in the magnetic field, serves as an e.m.f. pickup, and the e.m.f. is carried by the conductor 42 to conventional instrument circuits (not shown) adjacent the instrument plate 34. the e.m.f. is proportional to the flow rate of the fluid sodium, and hence serves to continuously indicate the fluid flow. It will be appreciated that fluctuation in the e.m.f. signal serves to detect passing voids caused by sodium boiling and by fission product gas being discharged. Because of the low resistivity of sodium, an electrical short circuit through the block 36 presents no problem. Two thermocouple and sheath assemblies 48 are carried by and passed through the instrument plate 34 and block 36 to project into the open channel 26 for purposes of indicating the temperature of the fluid flowing therethrough.

It will be appreciated that the sensors, blocks and instrument plate are readily withdrawn when the subassemblies are being handled. In addition, if one of the sensors should fail, it may readily be replaced from the top without the necessity of removing the subassemblies.

In the embodiment of FIG. 6, the inlet portion of a nuclear reactor subassembly, indicated generally at 50, is mounted on a support plate 52 in an opening 54, provided for the purpose. The subassembly has an inlet 56 through which passes liquid sodium, as indicated by arrows 58. The subassembly comprises an outer hexagonal shell 60 extending the length thereof, and a cylindrical wall 62 which forms a round-sectioned open channel 64 for the passage of the liquid sodium. In the annular space 66 between the cylindrical wall 62 and the hexagonal shell 60, a pair of permanent magnets 68 is installed so that a magnetic field traverses the open channel 64. A pair of pole pieces 70 is mounted adjacent the permanent magnets for purposes of enlarging the area of the magnetic field. It is noted that the permanent magnets 68 and the pole pieces 70 are constructed and arranged in a manner similar to that described hereinbefore in connection with permanent magnets 30, and pole pieces 32, FIG. 4.

Still referring to FIG. 6, a pair of electrodes 72 is mounted on the support plate 52, as at 74, and extends upwardly into the open channel 64. The electrodes are so disposed that an imaginary line 73 connecting both ends of the electrodes is perpendicular to the axis of flow of the fluid sodium and also perpendicular to the force of the magnetic field produced by the permanent magnets 68. The electrodes 72 are constructed and operate in the same manner as the electrodes 38, FIG. 5, described in detail hereinbefore. The sheaths, in a portion thereof subjected to the magnetic forces, serve as an e.m.f. pickup, the e.m.f. being proportional to the flow rate of the liquid sodium passing through the channel. The conductor portions of the electrodes serve to carry the e.m.f. to conventional instrument circuits, not shown, adjacent the support plate 52.

It will be appreciated that the sheath cable type electrodes described hereinbefore may be replaced with a non-magnetic metal pipe having a couple of electrodes attached to the wall to obtain more strength, if necessary.

It will also be appreciated that the subassembly permanent magnet flowmeters with inserted independent electrodes may also be employed in water-cooled reactors, if insulation is provided between the water and the pipe wall and also between the e.m.f. pickup and its support means.

In the embodiment of the invention of FIG. 7, the hexagonal nuclear reactor subassembly is the same as the subassembly described hereinbefore in connection with FIGS. 1 and 2, except that the electrodes 38 and the thermocouples and sheath assemblies 48 have been replaced. As seen in FIGS. 7 and 7a, a pair of electrodes, indicated generally at 75, project downwardly into the open channel 26. The electrodes are so disposed that an imaginary line 76 connecting the ends thereof is perpendicular to the axis of flow of the fluid sodium and also perpendicular to the force of the magnetic field produced by the permanent magnets 30. Each of the electrodes 75 comprises a stainless steel outer sheath 78, an insulator 79 and a thermocouple having a first member or wire 80 of one material and a second member or wire 82 of a second dissimilar material. The first wire 80 and the second wire 82 are grounded to the sheath 78 as shown at 84. Each pair of wires 80 and 82 leads to a remotely disposed suitable thermocouple read-out member 86, well-known in the art, for continuously indicating the temperature of the fluid flowing through the nuclear reactor assembly. One wire 82 of one electrode is fabricated from the same material as one wire 82 of the other electrode and these wires are led to a remotely disposed suitable flow read-out member 88, well-known in the art, for continuously indicating the flow of liquid metal such as sodium through the nuclear reactor. The first member or wire 80 may be fabricated from any suitable material, including a chrome-nickel alloy which may comprise, essentially, about 80 – 90 percent nickel and 10 – 20 percent chromium with or without iron. The second member or wire 82 may be fabricated from any suitable material, including an aluminum-nickel alloy which may comprise, essentially, about 94% nickel, 2.5% manganese, 2.0% aluminum, 1.0% silicon, and 0.5% iron. It will thus be appreciated that one pair of electrodes serves to measure both the temperature and the flow of a conductive fluid through a nuclear reactor assembly, thereby eliminating one set of probes.

It will thus be seen that the present invention does indeed provide an improved apparatus for continuously determining the flow of conductive fluids through a nuclear reactor subassembly which is free of any mechanically attached wires, thereby permitting the subassembly to be handled normally. The new and improved apparatus according to the present invention is superior in simplicity, economy and efficiency as compared to prior art such devices.

Although certain particular embodiments of the invention are herein disclosed for purposes of explanation, various modifications thereof, after study of this specification, will be apparent to those skilled in the art to which the invention pertains.

What is claimed and desired to be secured by Letters Patent is:

1. Apparatus for continuously determining the flow of conductive fluid comprising a nuclear reactor subassembly having a channel therein for the flow of said fluid therethrough, a pair of permanent magnets mounted adjacent said channel to produce a magnetic field traversing the channel, a pair of electrodes supported independently of the subassembly and projecting into said channel so that an imaginary line interconnecting the ends thereof is perpendicular to the axis of flow of said fluid through said channel and also perpendicular to said magnetic field, said electrodes serving as an e.m.f. pickup responsive to the fluid flow through said subassembly, and means for carrying said e.m.f. to instrument means, each of said electrodes having a stainless steel outer sheath and a medial stainless steel conductor, and insulation material being interposed therebetween, and said sheath being connected to said conductor at the end thereof, and said means for carrying said e.m.f. to said instrument means being said conductor.

2. Apparatus for continuously determining the flow of conductive fluid comprising a nuclear reactor subassembly having a channel therein for the flow of said fluid therethrough, a pair of permanent magnets mounted adjacent said channel to produce a magnetic field traversing the channel, a pair of electrodes supported independently of the subassembly and projecting into said channel so that an imaginary line interconnecting the ends thereof is perpendicular to the axis of flow of said fluid through said channel and also perpendicular to said magnetic field, said electrodes serving as an e.m.f. pickup responsive to the fluid flow through said subassembly, and means for carrying said e.m.f. to instrument means, each of said electrodes comprising a grounded type sheathed thermocouple having two members of dissimilar material, read-out means connected to at least one of said thermocouples for indicating the temperature of the conductive fluid, one member of one of said electrodes being of the same material as one member of the other electrode, fluid flow read-out means connected between said one members of the same material for indicating the flow of conductive fluid through the nuclear reactor assembly.

3. Apparatus according to claim 2 wherein said one member of each of said electrodes is fabricated from an aluminum-nickel alloy and wherein the other member of each of said electrodes is fabricated from a chrome-nickel alloy.

4. Apparatus for continuously determining the flow of conductive fluid comprising a support plate, a nuclear reactor subassembly mounted on said support plate, said subassembly having a lower inlet and an upper outlet for the flow of said fluid therethrough, said subassembly having an outer shell, an inner wall forming an open channel toward said outlet, a pair of permanent magnets interposed between said wall and said shell to produce a magnetic field traversing the open channel, an instrument plate mounted above said subassembly in spaced relationship with respect thereto, a block interposed between said plate and the top of said subassembly to prevent upward movement of said subassembly, a pair of electrodes carried by and passed downwardly through said instrument plate and said block and projecting downwardly into said open channel so that an imaginary line interconnecting the ends thereof is perpendicular to the axis of flow of said fluid through said subassembly and also perpendicular to said magnetic field, said electrodes serving as an e.m.f. pickup responsive to the fluid flow through said subassembly, and means for carrying said e.m.f. to instrument means.

5. Apparatus for continuously determining the flow of conductive fluid comprising a support plate, a nuclear reactor subassembly mounted on said support plate, said subassembly having a lower inlet and an upper outlet for the flow of said fluid therethrough, said subassembly having an outer hexagonal shell extending substantially the length thereof, a cylindrical wall forming a round-sectioned open channel towards said outlet, a pair of permanent magnets and a pair of pole pieces interposed between said cylindrical wall and said hexagonal shell to produce a magnetic field traversing the open channel, an instrument plate mounted above said subassembly in spaced relationship with respect thereto, a block interposed between said plate and the top of said subassembly to prevent upward movement of said subassembly, a pair of electrodes being carried by and passed downwardly through said instrument plate and said block and projecting downwardly into said open channel so that an imaginary line interconnecting the ends thereof is perpendicular to the axis of flow of said fluid through said subassembly and also perpendicular to said magnetic field, each of said electrodes having a stainless steel outer sheath, and a medial stainless steel conductor, an insulator interposed between said sheath and said conductor, said sheath being connected to said conductor at the end of said electrode, said sheath serving as an e.m.f. pickup responsive to the fluid flow through said subassembly, and said e.m.f. being carried by said conductor to instrument means, a thermocouple and sheath assembly passing downwardly through said instrument plate and said block and projecting downwardly into said open channel.

6. Apparatus for continuously determining the temperature and flow of conductive fluid through a channel comprising a pair of permanent magnets mounted adjacent said channel to produce a magnetic field transversely thereof, a pair of electrodes projecting into said channel so that an imaginary line interconnecting the ends thereof is perpendicular to the axis of flow of said fluid through said channel and also perpendicular to said magnetic field, each of said electrodes comprising a grounded type sheathed thermocouple having two members of dissimilar metals, read-out means connected to at least one of the thermocouples for indicating the temperature of the fluid flowing through said channel, one member of one of said electrodes being of the same material as one member of the other electrode, fluid flow read-out means connected between said one members for indicating the flow of conductive fluid through said channel.

7. Apparatus according to claim 6 wherein said one member of each of said electrodes is fabricated from an aluminum-manganese-nickel alloy.

8. Apparatus according to claim 6 wherein said one member of each of said electrodes is fabricated from an alloy comprising essentially about 94% nickel, 2.5% manganese, 2.0% aluminum, 1.0% silicon, 0.5% iron, and said other members are fabricated from a material comprising essentially about 80 – 90% nickel and 10 – 20% chromium.

9. Apparatus for determining the flow of conductive fluid comprising a support plate, a nuclear reactor subassembly mounted on said support plate, said subassembly having a lower inlet for the flow of said fluid therethrough, said subassembly having an outer shell, an inner wall forming an open channel towards said inlet, a pair of permanent magnets interposed between said wall and said shell to produce a magnetic field traversing the open channel, a pair of electrodes having one end thereof respectively mounted on said support plate adjacent the inlet of said subassembly and the other ends of said electrodes extending upwardly into said open channel so that an imaginary line interconnecting the ends thereof is perpendicular to the axis of flow of said fluid through said subassembly and also perpendicular to said magnetic field, said electrodes serving as an e.m.f. pickup responsive to the fluid flow through said subassembly, and means for carrying said e.m.f. to instrument means.

10. Apparatus for determining the flow of conductive fluid comprising a support plate, a nuclear reactor subassembly mounted on said support plate, said subassembly having a lower inlet for the flow of said fluid therethrough, said subassembly having an outer hexagonal shell extending substantially the length thereof, a cylindrical wall forming a round-sectioned open channel towards said inlet, a pair of permanent magnets and a pair of pole pieces interposed between said cylindrical wall and said hexagonal shell to produce a magnetic field traversing the open channel, a pair of electrodes having one end thereof respectively mounted on said support plate adjacent the inlet of said subassembly and the other ends of said electrodes extending upwardly into said open channel so that an imaginary line interconnecting the ends thereof is perpendicular to the axis of flow of said fluid through said subassembly and also perpendicular to said magnetic field, each of said electrodes having a stainless steel outer sheath, and a medial stainless steel conductor, an insulator interposed between said sheath and said conductor, said sheath being connected to said conductor at the end of said electrode, said sheath serving as an e.m.f. pickup responsive to the fluid flow through said subassembly, and said e.m.f. being carried by said conductor to instrument means.

* * * * *